United States Patent [19]

Lee

[11] Patent Number: 5,287,131
[45] Date of Patent: Feb. 15, 1994

[54] COLOR LCD SYSTEM OF PROJECTION TYPE

[75] Inventor: Jongcheon Lee, Kyunggi, Rep. of Korea

[73] Assignee: Samsung Electron Devices Co., Ltd., Kyunggi, Rep. of Korea

[21] Appl. No.: 981,861

[22] Filed: Nov. 25, 1992

[30] Foreign Application Priority Data

Dec. 30, 1991 [KR] Rep. of Korea .............. 91-25223

[51] Int. Cl.$^5$ ........................................... G03B 21/00
[52] U.S. Cl. .................................. 353/31; 353/84; 353/88
[58] Field of Search ............. 353/30, 31, 94, 88, 353/122, 89, 97; 359/66, 68, 69

[56] References Cited

U.S. PATENT DOCUMENTS

| | | | |
|---|---|---|---|
| 4,090,219 | 5/1978 | Ernstoff et al. | 358/59 |
| 4,368,963 | 1/1983 | Stolov | 353/31 |
| 4,919,518 | 4/1990 | Ogino et al. | 353/94 |
| 4,928,123 | 5/1990 | Takafuji | 353/122 |
| 4,969,731 | 11/1990 | Ogino et al. | 353/31 |
| 5,144,462 | 9/1992 | Otsuka et al. | 353/31 |

FOREIGN PATENT DOCUMENTS

| | | |
|---|---|---|
| 478186 | 4/1992 | European Pat. Off. |
| 8701495 | 3/1987 | PCT Int'l Appl. |
| 2172733 | 9/1986 | United Kingdom |
| 2218842 | 11/1989 | United Kingdom |

Primary Examiner—William A. Cuchlinski, Jr.
Assistant Examiner—William C. Dowling
Attorney, Agent, or Firm—Christie, Parker & Hale

[57] ABSTRACT

A projection color liquid crystal display (LCD) system uses a large reflecting liquid crystal (LC) panel as a screen. The system includes three unicolor light sources for emitting lights of the colors red, green and blue, respectively, the light sources being disposed remote from the screen; three light shutters for permitting the red, green, and blue light beams to successively and periodically pass to the screen; and three diffusing lenses for diffusing the respective beam which is passing to the screen. Each respective light shutter permits the passage of a corresponding light beam. The color driving signal corresponding to the light beam from the image controlling circuit is applied to the driver to drive the LC panel. As a result, the red, green and blue light beams are successively reflected from the reflection type LC panel according to the color driving signal. Since the reflecting frequency of successive three color light beams is under 1/30 of a sec and, a person who is looking at the front side of the screen recognizes successive three color light beams as the composite color screen.

10 Claims, 4 Drawing Sheets

COLOR LCD SYSTEM OF PROJECTION TYPE

FIELD OF THE INVENTION

The present invention relates to a color liquid crystal display (LCD) of the projection type and, more particularly to a color LCD system of the projection type which can optionally modulate a color and brightness of the LCD by appropriate modulation of the respective intensity of the colors red, green and blue projected onto a display in accordance with the use of a reflection type LCD as a screen.

BACKGROUND OF THE INVENTION

A conventional color image projection system granted in U.S. Pat. No. 4,368,963 as illustrated in FIG. 4.

This color image projection system includes a large screen 1, three lenses 2, three identical liquid crystal panels 3, three color filters 4, 5 and 6, respectively of the colors red, green and blue, three white light sources 7 and three reflectors 8.

In this projection system, light from the light sources 7 passes through the corresponding filters 4, 5 and 6 and a liquid crystal (LC) panel 3, resulting in its incidence into the respective lenses 2.

Since the respective lenses 2 are focused in the same place onto the screen 1, the mixture of the three colored composites projected on the screen via the lenses 2 creates a multicolor image.

For example, if the composite portions of an image or picture must be in the color red, the light intensity is modulated by connecting the variable frequency and/or amplitude voltage source 31 to the LC panel 3 and varying the applied voltage and the frequency of the applied volatge.

Behind the LC panel 3 is disposed the red filter 4, which is made of red transparent glass or plastic. The color filters 4, 5 and 6 could alternatively be disposed in front of the LC panel 3 or even in front of the lenses 2.

Behind the light sources 7, there are reflectors 8 for improving light efficiency. Light from each of the sources 7 passes through a respective filter and through a liquid crystal panel 3. Each respective lens magnifies and projects all of the energized port ions of the liquid crystal panel onto the screen. By such manner, the mixture of the three colored composites on the screen creates a multicolor image or picture with high resolution.

However, in the case of a conventional projection system, due to the close distance between the sources 7 and the LC panels 4, 5 and 6, in order to raise the brightness, a cooling device is needed because heat generated from the source 7 has an influence over the LCD characteristics. However, difficulties in the technology of this device result in a limitation in the light intensity. Accordingly, the light intensity cannot be suitably modulated, so that there are difficulties in the modulation of the brightness. Thus, a conventional system has a definite disadvantage of reducing the brightness on the screen.

SUMMARY OF THE INVENTION

Accordingly, an object of the present invention is to provide a projection type color liquid crystal display of new structure which provides an improved brightness using a liquid crystal (LC) panel capable of displaying any kind of data on a screen.

To achieve this object, the present invention proposes a color LCD system of the projection type including:

a plurality of unicolor light sources;

a plurality of light shutters disposed in front of the respective corresponding light source to permit the unicolor light from the light source to alternatively and periodically pass therethrough;

a plurality of diffusing lenses disposed in front of the respective corresponding light shutter to project incident unicolor light beams to a common screen; and a reflecting liquid crystal panel screen disposed at a predetermined distance apart from the diffusing lens in order to selectively reflect the light beams according to information to be displayed of the same color as that of the unicolor light beam projected through the diffusing lens.

According to the present invention, the frequency of the being alternately passed and blocked by a light shutter is such that the respective unicolor light which is successively projected produces an illusion of the composite color light due to the afterimage phenomenon.

Also each respective shutter is such that, when there are n different unicolor light sources the light passes with a frequency of $1/n$, and the light is cut off or blocked during the rest of the time, i.e. $1-1/n$.

Further, the same effect as that of the above could be obtained even when a white light source is selected instead of the above unicolor light source and color filters corresponding to the white light source are disposed between the light shutter and the white light source.

The color filter and the light shutter corresponding thereto can be substituted for a negative plate provided with a unicolor light beam passing part and blocking part capable of using the light filter as the shutter.

The above respective light shutter is driven by the successive inducement with the LC panel.

When the successive driving frequency of the light shutter and LC panel is under 1/30 sec, the repective unicolor beam of red, green and blue light which is successively projected is recognized as the projection of one color light beam. According to the present invention, the light source and the LC panel are sufficiently separated from each other, so that it is possible to increase respective unicolor light source or the white light source intensity enough to obtain the improved brightness.

BRIEF DESCRIPTION OF THE DRAWINGS

Further advantages and other objects of the present invention will be apparent in the following detailed description in connection with the accompanying drawings, in which.

DETAILED DESCRIPTION OF THE PREFERRED EMBODIMENT

Figure 1:
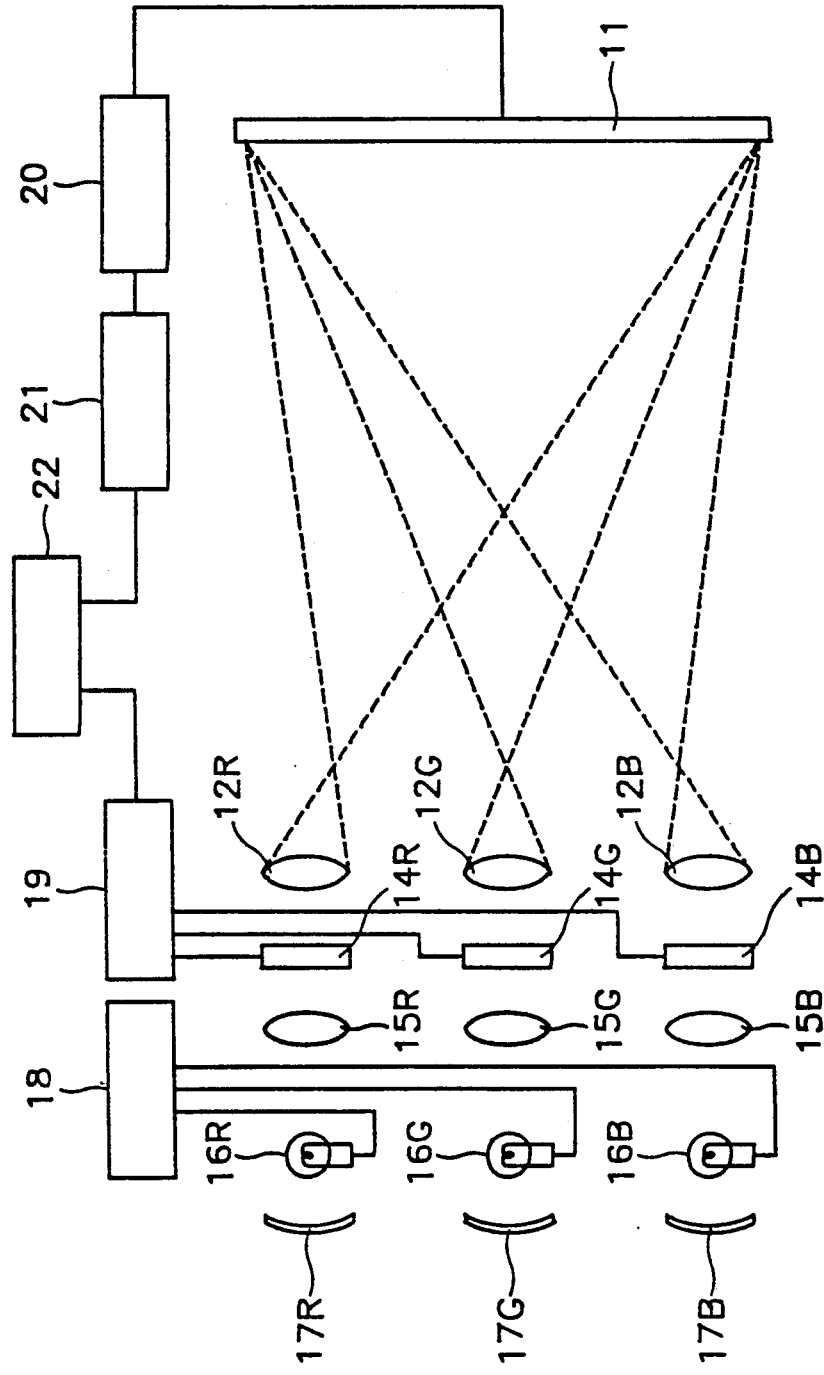
FIG. 1 is a schematic sectional view of the first embodiment of a projection color liquid crystal display LCD system of the present invention.

FIG. 1 describes the first embodiment of a projection color liquid crystal display LCD system of the present invention.

This embodiment discloses three light sources capable of emitting three colors of light: red, green and blue; and three lenses and light shutters corresponding to each of the light sources. However, the technical idea of the present invention would not be restricted within that and a system can be provided having two colors, four colors or more colors as necessary.

This system shown in FIG. 1 is such that three unicolor light sources 16R, 16G, 16B, e.g. three lamps which emit three sources of the lights red, green and blue are connected to a lamp voltage controlling circuit 18 so as to change the light intensity emitted from a respective light source.

In front of the three unicolor sources are focusing lenses 15R, 15G, 15B for focusing the light emitted from the respective light source and behind the three unicolor sources, reflectors 17R, 17G, 17B are disposed corresponding thereto. However, the focusing lenses are not essential in the present invention.

Light shutters 14R, 14G, 14B are disposed in front of the respective focusing lens 15R, 15G, 15B. A light shutter controlling circuit 19 which successively permits a respective unicolor light beam connected to a respective light shutter 14R, 14G, 14B to pass therethrough during the frequency of $\frac{1}{3}$ and to cut off during the frequency of $\frac{2}{3}$ is connected to respective light shutter 14R, 14G, 14B. At that time, the successive operating frequency t of respective light shutter 14R, 14G, 14B is under 1/30 sec.

In the meantime, diffusing lenses 12R, 12G, 12B each having a determined projection angle and focusing distance to project a respective successive unicolor light beam through the light shutter are disposed in front of the respective light shutters 14R, 14G, 14B.

Also, a large liquid crystal LC panel 11 serving as a screen is disposed remote from the diffusing lenses 12R, 12G, 12B. This LC panel is formed in the reflection type reflecting the light when the driving voltage is applied to the corresponding picture element.

The LC panel 11 is successively connected to a liquid crystal display LCD driver 20 to drive the panel; an image controlling circuit 21 to supply a driving signal based on a color information of respective color with the driver 20; and a frame inducing circuit 22 to induce the respective light shutter 14R, 14G, 14B and image controlling circuit 21.

Thus, at the same time when the light beam of the colors red, green and blue is successively projected from the respective light shutters 14R, 14G, 14B onto the LC panel 11, the color driving signal corresponding to the light beam from the image controlling circuit 21 is applied to the driver 20 to drive the LC panel 11.

As a result, the light beams of the colors red, green and blue are successively reflected from the reflection type LC panel 11 according to the color driving signal. Since the reflecting frequency t of successive three color light beams is under 1/30 sec, a person who is looking at the front side of the screen recognizes and three successive color light beams as the composite color screen.

In this system, since the LC panel is formed remote from the light source distinct from that of a conventional system, increasing considerably the light source intensity does not have an influence over the LC panel characteristic, resulting in good brightness. Further, the respective light source could be easily controlled and the respective color could be easily corrected. Also, a cooling device for cooling the LC panel is not necessary any more.

Figure 2:
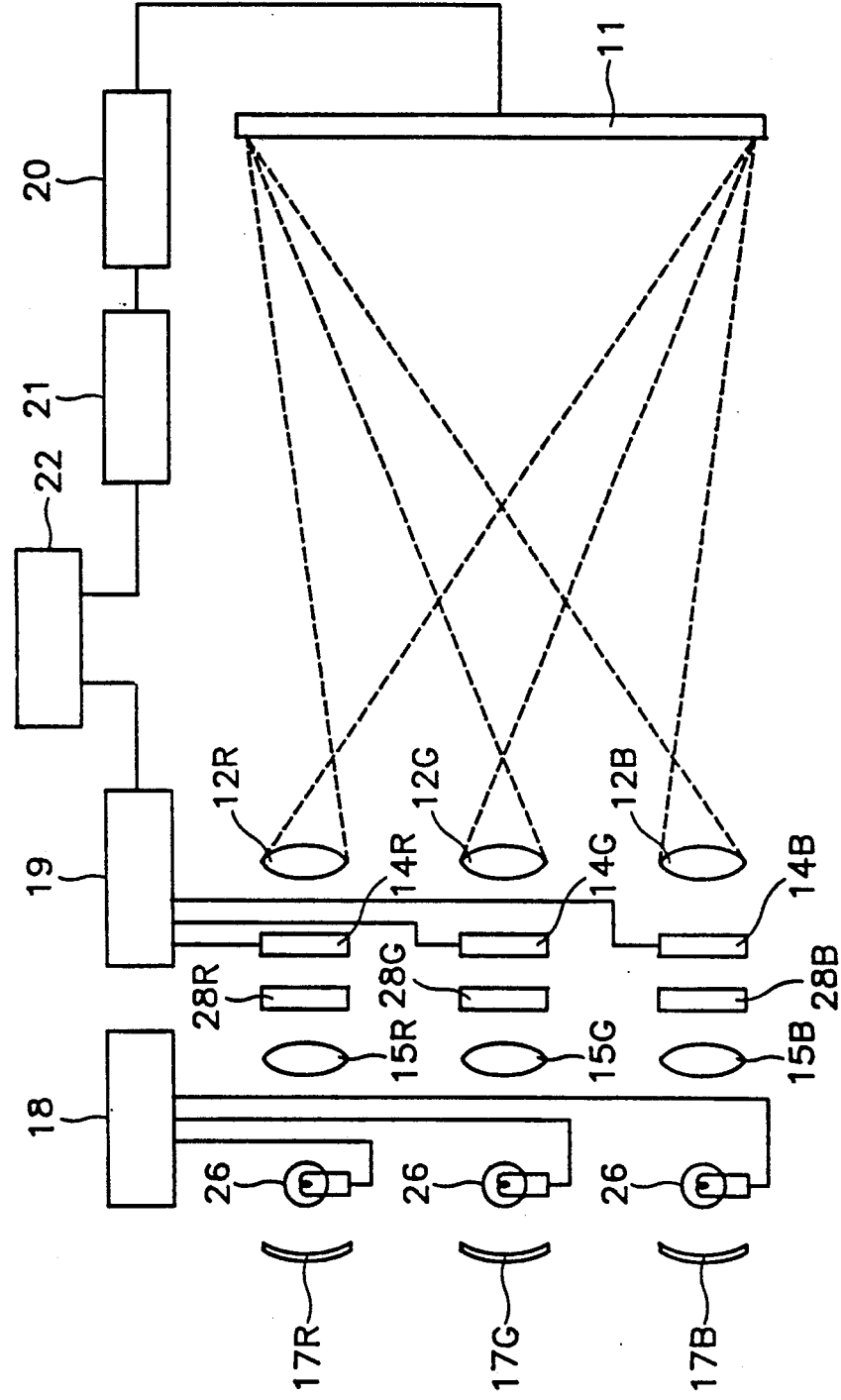
FIG. 2 is a schematic sectional view of the second embodiment of a projection color LCD system of the present invention.

FIG. 2 describes the second embodiment of the projection color LCD system of the present invention.

The second embodiment of FIG. 2 is nearly the same as the first embodiment of FIG. 1. The same reference numbers therebetween are given to the same parts. Description of the same parts will be omitted.

The difference between the first and second embodiments is that, in the second embodiment, a white light source is used as the light source and so, in order to obtain the respective light beams of the colors red, green and blue, filters of the colors red 28R, green 28G, and blue 28B are disposed between the focusing lenses 15R, 15G, 15B and the light shutters 14R, 14G, 14B.

Thus, each respective light beam from the color filters 28R, 28G, 28B is controlled through the same path as that of the first embodiment so as to be projected onto the LC panel 11, from which the light beam is selectively reflected to display any kind of characters and graphic information in color.

Figure 3:
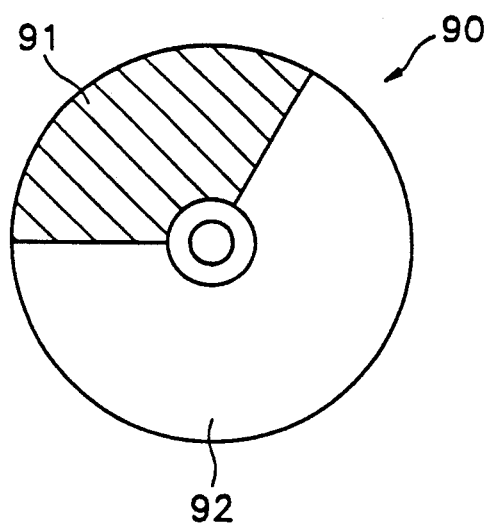
FIG. 3 is a plan view of a shutter used as a light filter of the present invention.
Figure 4:
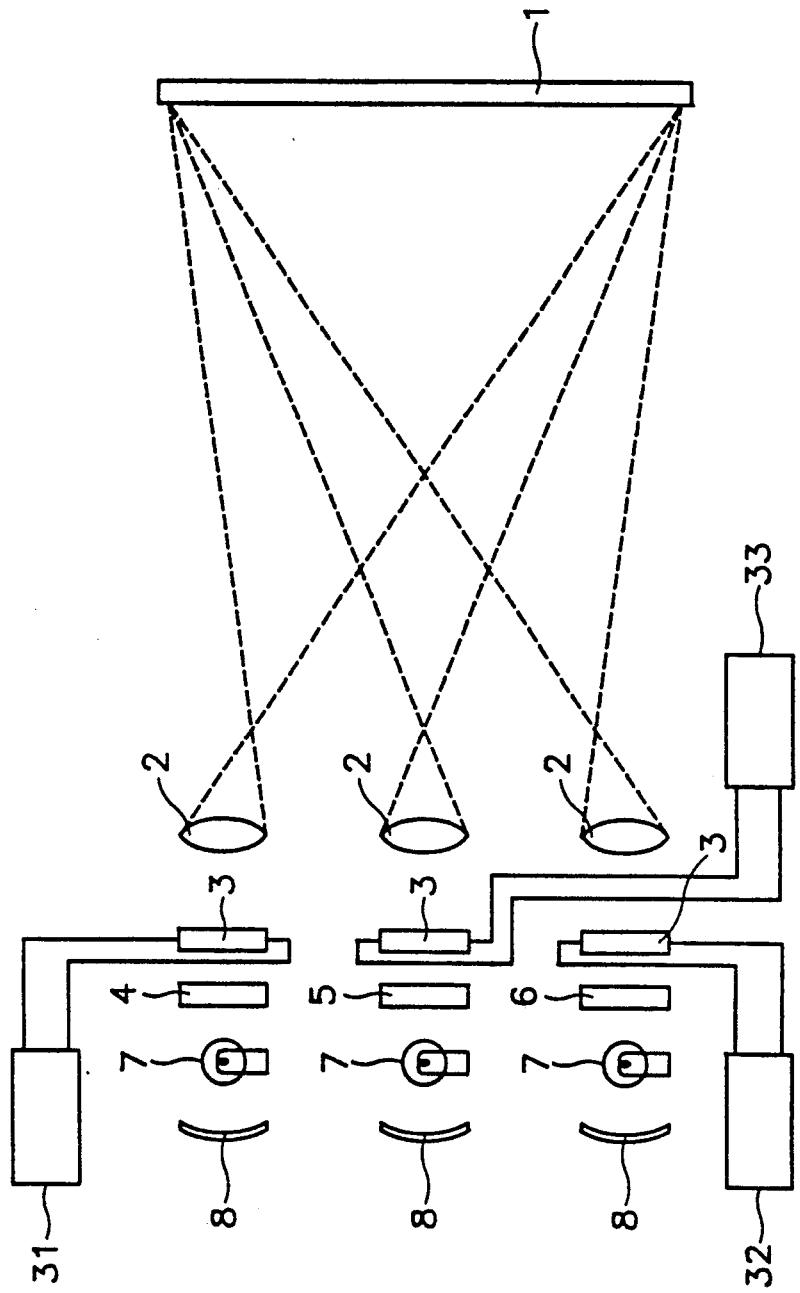
FIG. 4 is a schematic sectional view of a conventional color image projection system.

FIG. 3 describes an example of the shutter 90 used as the red light filter and the light shutter corresponding to the color filter shown in FIG. 2.

The shutter 90 used as the red light filter includes a negative plate provided with a light beam passing part 91 corresponding to the color filter through which only the red light can pass and a light beam cutting part 92 through which the light beam can not pass.

The area ratio of the light beam passing part 91 to cutting part 92 is 1:2. Namely, in case of choosing the light source number of n, the area ratio of the light beam passing part to cutting part is $1:n-1$.

Accordingly, when the negative plate shown in FIG. 3 is rotated one revolution, the red light beam passes during the frequency of $\frac{1}{3}$ while the light beam cuts off during the frequency of $\frac{2}{3}$. Instead of this manner, the shutter can also be used as the light filter of the colors green and blue could be easily provided.

While the shutter used as the light filter such as the above is mechanically formed, those skilled in the art could easily use it electronically, optically and the like.

The number of the light source and the kind of the corresponding color would not be restricted within this embodiment of the present invention. The change of the number of the light source is easily performed by those skilled in the art.

The projection color LCD system of the present invention can be applied in high quality professional devices, as multicolor data and graphic screens associated with computers, radar apparatus, advertising displays, apparatus for providing theatre backgrounds, and in many other art areas where an image or picture projection system may be used.

It is understood that the above description is for the purpose of describing the various embodiments of the invention, and those skilled in this art will recognize that various modification and changes can be made without departing from the scope of the invention, which scope is to be determined by the following claims and the equivalents to which the elements thereof are entitled.

What is claimed is:

1. A color LCD system of a projection type comprising
   a reflecting liquid crystal panel screen;
   a plurality of unicolor light sources;
   a plurality of light shutters, one disposed in front of each corresponding light source to permit the unicolor light from the corresponding light source to alternately pass therethrough and be blocked thereby; and
   a plurality of diffusing lenses, one disposed in front of each corresponding light shutter to project an incident unicolor light beam to the reflecting liquid crystal panel screen, the screen being disposed at a predetermined distance from the diffusing lenses in order to selectively reflect the light beams according to information to be displayed.

2. The color LCD system of claim 1, further comprising a plurality of focusing lenses for focusing the unicolor light emitted from each light source, each lens being disposed between a corresponding unicolor light source and light shutter.

3. The color LCD system of claim 1, wherein the light shutters alternate between positions where light passes through and light is blocked such that the light from each light source is on the panel screen alternately and successively, so that due to an afterimage phenomenon, an illusion that the respective unicolor lights which alternately pass to the panel screen from composite color light.

4. The color LCD system of claim 1, further comprising n different sources each having a different unicolor light.

5. The color LCD system of claim 3, further comprising n different light sources each having a different unicolor light, wherein each light shutter has a ratio of light passing to light blocking of 1 to (n−1).

6. The color LCD system of claim 1, further comprising means for synchronizing each of the light shutters with an application of color display information for the liquid crystal panel.

7. A color LCD system of a projection type comprising:
   a reflecting liquid crystal panel screen;
   a plurality of white light sources for emitting light;
   a plurality of focusing lenses for focusing the light emitted from each corresponding light source;
   a plurality of color filters for filtering only a specific color light corresponding to the respective focusing lens;
   a plurality of light shutters for periodically permitting passage of incident light beams of the specific color light corresponding to a respective one of the color filters, such passage of each specific color light being successive; and
   a plurality of diffusing lenses, each disposed in front of a respective corresponding light shutter to project incident unicolor light beams to the reflecting liquid crystal panel screen, the screen being disposed at a predetermined distance apart from the diffusing lens in order to selectively reflect the light beams according to information to be displayed of the same color as that of the unicolor light beam projected through the diffusing lens.

8. The color LCD system of claim 7, wherein the respective light shutter and color filter comprises a shutter used as a light filter having one body and the shutter used as the light filter comprises a plate provided with a light beam passing part and a light beam blocking part.

9. The color LCD system of claim 8, wherein each of the shutters being used as the light filter has a frequency under 1/30 sec and, if the number of shutters used as the light filters is n, an area of the light beam passing part of the plate is 1/n of an area of the whole plate.

10. The color LCD system of claim 9, wherein the shutters are formed one of optically and electronically.

* * * * *